United States Patent Office 3,451,796
Patented June 24, 1969

3,451,796
METHOD OF TREATING STRENGTHENED GLASS SURFACE TO INCREASE ACID DURABILITY
Ellen L. Mochel, Painted Post, N.Y., assignor to Corning Glass Works, Corning, N.Y., a corporation of New York
No Drawing. Filed May 16, 1966, Ser. No. 550,181
Int. Cl. C03c 15/00
U.S. Cl. 65—31                    3 Claims

ABSTRACT OF THE DISCLOSURE

This invention relates to a method for increasing the acid durability of chemically strengthened glass articles by exposing the surface of the article to an atmosphere containing sulphur oxide so as to dealkalize the surface and thus increase its acid durability.

---

The chemical strengthening of glass is a very recent development in the field of glass technology and, in broad terms, involves the exchange of monovalent ions from a glass article with larger monovalent ions originating from an external source. This exchange is carried out at a temperature below the strain point of the glass such that there is no substantial relaxation of the stresses resulting from introduction of the larger ions into the sites originally occupied by smaller ions.

The process techniques and the theoretical considerations involved in chemically strengthening alkali metal silicate glasses by exchanging a relatively small alkali metal ion in the surface of the glass with a relatively larger monovalent ion are discussed in British patent specification No. 917,388. The utilization of these techniques with specific alumina and zirconia containing glasses, whereby articles exhibiting high strength even after abrasion of the surface thereof are produced in a relatively brief exchange time, is disclosed in my pending applications, Serial Nos. 181,887 and 181,888, respectively, both now abandoned.

It can readily be appreciated that the use of glasses in some instances requires, in addition to high mechanical strength, good resistance to attack by acids. Acid durability is measured by the amount of alkali metal released into an acid solution which is permitted to contact a glass surface for a specified length of time.

Glassware used in the laboratory and in the pharmaceutical industry must meet high acid durability standards. In practice, however, where the components of a glass are so chosen as to secure especially desirable melting and forming characteristics accompanied with the potential for high chemical strengthening, the acid durability of the glass is frequently quite inadequate to permit its use in many product applications.

The principal object of this invention is to provide a method for producing chemically strengthened glass having excellent acid durability characteristics.

It has been recognized in the glass industry that the acid durability of alkali metal-containing glasses can be improved by the extraction of alkali metal ions from the glass surface. Accordingly, where improved acid durability has been required in glass articles, it has been the established practice to contact the glass surface with an acidic medium to remove alkali metal ions therefrom. Thus, medicine bottles, ampoules, and other pharmaceutical glassware are often annealed or otherwise heat treated in an atmosphere containing sulphur dioxide ($SO_2$) to dealkalize the glass surface and, thereby, improve its resistance to acid attack. However, such dealkalizing treatment has been conducted at temperatures above the strain point of the glass in order to avoid a condition of crazing in the glass surface. Obviously, a heat treatment at such a temperature would be completely incompatible with the type of chemical strengthening described above. The compressive stresses resulting from the ion exchange would be relaxed and the strengthening effect produced from these compressive stresses would be lost. Furthermore, since the compressive stresses are induced through the presence of alkali metal ions in the glass surface, the extraction of such ions by the acidic medium might reasonably be expected to relieve the compressive stress in any event.

I have discovered a method through which a chemically strengthened glass article can be dealkalized to improve the acid durability characteristics of the surface thereof without significant loss of strength and without causing crazing in the surface. This invention is founded upon two principal factors: (1) the dealkalization is carried out at a temperature below the strain point of the glass; and (2) the depth of the dealkalized layer is held within very rigid limits. Hence, I have learned that the desired combination of high strength through chemical strengthening and excellent acid durability can be attained in glass articles where the extraction of alkali metal ions from the surface is conducted at a temperature below that at which the compressive stresses produced through ion exchange would be substantially relaxed, and the depth of the removal of alkali metal ions is restricted to three microns. Thus, where the depth of alkali metal extraction is limited to the outer few microns of glass surface, the desired improvement in acid durability is attained, while the extent of removal is not sufficient to cause crazing or the expected stress release.

In its broadest terms, my invention comprises exposing an alkali metal silicate glass article, which has been chemically strengthened through the introduction of compressive stresses in a surface layer thereof by the exchange of relatively small alkali metal ions in the glass surface with large monovalent ions at a temperature below the strain point of the glass, to an atmosphere containing a sulphur oxide for a sufficient period of time to dealkalize the glass surface to a depth of not over about three microns and, preferably, not over about one micron, the exposure to the sulphur oxide-containing atmosphere being carried out at a temperature below the strain point of the glass.

In the actual practice of my invention, a glass article of a predetermined configuration is initially formed from an alkali metal silicate glass. In order to insure that the article will have high strength even after surface abrasion, a glass containing at least 5% by weight of alumina ($Al_2O_3$) or zirconia ($ZrO_2$) will be utilized in accordance with the teachings of my above-mentioned pending patent applications. The glass article is brought into contact with a material containing a monovalent ion having a larger ionic diameter than that of the alkali metal ion in the glass. This larger diameter monovalent ion may be an alkali metal or the exchange has been successfully carried out employing copper and silver ions, and glasses exhibiting very high strengths obtained thereby. Such contact is conveniently accomplished by immersing the glass article in a bath of a molten salt for a sufficient length of time to permit the larger diameter monovalent ions from the salt bath to migrate into the glass surface to replace the relatively small-sized alkali metal ions in the glass surface which migrate out therefrom into the salt bath. This ion exchange process must be carried out at a temperature below that at which compressive stresses are relaxed in the glass. It can be appreciated that stress release is a function of time as well as of temperature. Nevertheless, the strain point of a glass is commonly recognized as the temperature at and above which stress relaxation proceeds relatively rapidly. Thus, the ion exchange process is conducted at temperatures below the strain point, generally about 50°–200° C. below the strain point.

The dealkalizing treatment of this invention is subject to similar temperature restrictions. Thus, the treatment must be carried out below the strain point of the glass and, preferably, at least 100° C. below this temperature in order to insure against any significant stress release. However, the rate of extraction of alkali metal ions is also a function of temperature so it is the preferred practice to treat the glass at a temperature not lower than about 200° C. below the strain point of the glass.

When the dealkalizing process is conducted within this preferred range of temperatures, the removal of alkali metal ions to the desired depth of not over about three microns is usually accomplished within a period of time ranging from about one to twenty minutes, the time required being dependent primarily upon the temperature utilized and the concentration of the sulphur oxide in the atmosphere. Thus, the optimum conditions of treatment can be readily determined through routine experimentation.

While the presence of as little as 0.1 mol percent sulphur oxide in the treating atmosphere is effective to dealkalize the surface of the glass, the rate of alkali metal removal is quite slow and it is much more desirable to employ larger concentrations. Hence, the inclusion of at least 2 mol percent of sulphur oxide has been deemed a reasonable minimum for commercial practice with amounts of 20 mol percent and higher being preferred. I have learned that utilizing a catalyzed $SO_2$-$O_2$ atmosphere, whereby the proportion of sulphur trioxide ($SO_3$) is increased, frequently speeds the rate of extraction twofold or more. An enhanced sulphur trioxide atmosphere can also be attained by employing sulphuric acid, gaseous $SO_3$, or a decomposable sulphate salt as a source of the treating atmosphere. A molten salt bath, such as of sodium acid sulphate ($NaHSO_4$), can also be used in lieu of a gaseous atmosphere. The rate of alkali metal extraction appears to increase with added amounts of water vapor in the treating atmosphere. Atmospheres containing as much as 70% by weight water vapor have been conveniently produced by bubbling oxygen or air through water prior to introducing the gases into the treating chamber.

The following specific examples are illustrative of the process of the invention and demonstrate the improvement in acid durability resulting therefrom.

Several sets of six test pieces in the form of glass cane about four inches long with a diameter of about one-quarter inch were made from a glass having the approximate composition by weight: 65% $SiO_2$, 21% $Al_2O_3$, 9% $Na_2O$, 4% $Li_2O$, and 1% MgO. The strain point of this glass was about 505° C. These several sets of cane were chemically strengthened by being immersed in a molten bath of sodium nitrate ($NaNO_3$) for two hours at 450° C. Strengthening of the glass took place due to the migration of sodium ions into the glass surface from the molten salt replacing lithium ions which had migrated out into the bath.

After the chemical strengthening treatment, four sets of the test pieces were selected and each set subjected to a different set of thermal and environmental conditions. Hence, one set was heated in air for ten minutes at 400° C. A second set was heated in contact with sulphur trioxide ($SO_3$) by the expedient of immersing the test cane for ten minutes in a solution of equal parts of water and sulphuric acid ($H_2SO_4$) maintained at 400° C. A third set was heated for two minutes in a like solution of water and $H_2SO_4$ maintained at 400° C. A fourth set was heated for ten minutes in a like solution of water and $H_2SO_4$ maintained at 300° C. A fifth set of test cane was given no treatment and was employed as reference standards. Following the various heat treatments, the cane in each set were broken individually in flexure in the conventional manner for modulus of rupture (MOR) measurements the force required for fracture observed, and an average value of modulus of rupture for each set computed in p.s.i. The measurements thus secured are recorded in Table I.

TABLE I

| Treatment: | MOR |
|---|---|
| Air—10 minutes—400° C. | 64,000 |
| $H_2SO_4$: | |
| 10 minutes—400° C. | 44,000 |
| 2 minutes—400° C. | 60,000 |
| 10 minutes—300° C. | 65,000 |
| None | 64,000 |

It can be observed that some loss of strength occurred in the sulphur oxide treatment at 400° C., particularly after the longer exposure time, while no loss was evident at 300° C. Also, the effect of time and temperature on the strength of the glass article is clearly manifested from the two sets of cane treated at 400° C. However for some product applications, the reduction in strength resulting from the sulphur oxide treatment may be tolerable, or may even be desirable in achieving a particular stress pattern in the glass article.

Thirty commercial centrifuge tubes were then formed fom the above-described glass composition and subjected to the same chemical strengthening procedure as that applied to the previously discussed test cane. Following this, 15 of the tubes were immersed in the above-defined water-sulphuric acid solution for ten minutes at 300° C. Two types of acid durability tests were then conducted on these tubes, the tubes which had been chemically strengthened but not subjected to the sulphur oxide treatment being utilized as control samples.

One group of 12 sulphur oxide-treated and 12 untreated centrifuge tubes was tested according to U.S.P. XVI (U.S. Pharmacopoeia XVI, 918–920) for Type II glass containers. This test involves attack on the inner surface by special distilled water in an autoclave operating at 121° C. and 15 p.s.i. pressure. Three treated tubes and three untreated tubes were subjected to this test for the times recorded in Table II and the solutions after the conclusion of each test analyzed for total alkali extracted. The averages of the amounts extracted from the three samples of treated and untreated tubes are expressed in Table II in terms of micrograms of $Na_2O$ per square centimeter of tube surface.

TABLE II

| | Total alkali extracted | |
|---|---|---|
| Time in days | Untreated | Sulphur oxide treated |
| 1 | 3.0 | 0.5 |
| 4 | 4.5 | 1.0 |
| 9 | 5.0 | 1.1 |
| 16 | 5.5 | 1.2 |

A second group of three sulphur oxide-treated and three untreated centrifuge tubes was tested according to U.S.P. XV (U.S. Pharmacopoeia XV, 925) for Type II glass containers. This test involves attack on the inner surface of 0.0002 N $H_2SO_4$ in an autoclave operating at 121° C. and 15 p.s.i. pressure. The tubes were exposed to this environment for one hour. The test results are expressed as milliliters of 0.02 N $H_2SO_4$ consumed or neutralized during the test and are calculated from the actual 0.02 N NaOH titre required to neutralize a 100 milliliter portion of the extract. An average of the three samples of each of the treated and untreated tubes showed that the solution remaining from the untreated tubes consumed about 0.54 milliliter of 0.02 N $H_2SO_4$ while that remaining after testing the sulphur oxide treated tubes consumed only about 0.28 milliliter.

An examination of the results of these two tests clearly demonstrates the marked improvement in resistance to acids and distilled water imparted to the chemically strengthened glasses by the sulphur oxide treatment.

Numerous modifications of the invention are apparent from the foregoing description and are deemed to be included within the scope of the appended claims. In particular, any oxide of sulphur having dealkalizing properties may be utilized and the specific conditions of treatment varied depending upon the materials employed and the degree of acid durability improvement desired. Where copper or silver ions are utilized in the chemically strengthening process, the acid durability of the strengthened article is inherently much better than where a large diameter alkali metal ion has been used to replace a relatively small alkali metal ion in the surface of the glass. Nevertheless, the chemical strengthening process does not replace all of the alkali metal in the glass surface and the instant invention acts to improve the acid durability of such products also.

I claim:

1. A method for improving the acid durability of a chemically strengthened alkali metal silicate glass article which comprises exposing the surface of the article to an atmosphere containing a sulfur oxide at a temperature below the strain point of the glass for a period of time between about 1 and 20 minutes so as to extract alkali metal ions from the glass surface to a depth of less than about three microns.

2. A method according to claim 1 wherein the temperature at which the glass article is exposed ranges between about 100°–200° C. below the strain point of the glass.

3. A method according to claim 1 wherein the atmosphere contains sulphur trioxide.

References Cited

UNITED STATES PATENTS

| | | | |
|---|---|---|---|
| 1,782,169 | 11/1930 | Kamita | 65—31 |
| 3,348,934 | 10/1967 | Hinson et al. | 65—30 |
| 3,356,477 | 11/1967 | Chisholm et al. | 65—30 |

S. LEON BASHORE, *Primary Examiner.*

J. H. HARMAN, *Assistant Examiner.*

U.S. Cl. X.R.

65—30